United States Patent
Kemp

(10) Patent No.: US 7,684,984 B2
(45) Date of Patent: Mar. 23, 2010

(54) METHOD FOR RECOGNIZING SPEECH/SPEAKER USING EMOTIONAL CHANGE TO GOVERN UNSUPERVISED ADAPTATION

(75) Inventor: Thomas Kemp, Remseck (DE)

(73) Assignee: Sony Deutschland GmbH, Cologne (DE)

( * ) Notice: Subject to any disclaimer, the term of this patent is extended or adjusted under 35 U.S.C. 154(b) by 1010 days.

(21) Appl. No.: 10/364,122

(22) Filed: Feb. 11, 2003

(65) Prior Publication Data

US 2003/0154076 A1    Aug. 14, 2003

(30) Foreign Application Priority Data

Feb. 13, 2002    (EP)    .................................. 02003337

(51) Int. Cl.
*G10L 15/26* (2006.01)
(52) U.S. Cl. ..................................... 704/235
(58) Field of Classification Search ................ 704/236, 704/246, 251
See application file for complete search history.

(56) References Cited

U.S. PATENT DOCUMENTS

| | | | | |
|---|---|---|---|---|
| 5,539,860 | A * | 7/1996 | DeSimone et al. | 704/234 |
| 5,539,861 | A * | 7/1996 | DeSimone | 704/234 |
| 5,987,415 | A | 11/1999 | Breese et al. | |
| 6,151,571 | A * | 11/2000 | Pertrushin | 704/209 |

FOREIGN PATENT DOCUMENTS

| | | |
|---|---|---|
| EP | 0 470 411 | 2/1992 |
| EP | 1 022 725 | 7/2000 |
| GB | 2 348 035 | 9/2000 |

OTHER PUBLICATIONS

"Improved speech recognition via speaker stress directed classification" Womak, B.D.; Hansen, J.H.L.; Acoustics, Speech, and Signal Processing, 1996. ICASSP-96. Conference Proceedings., 1996 IEEE International Conference on vol. 1, May 17-10, 1996 pp. 53-56 vol. 1.*

"Cepstral domain talker stress compensation for robust speech recognition", Chen, Y.;Acoustics, Speech and Signal Processing, IEEE Transactions on vol. 36, Issue 4, Apr. 1988 pp. 433-439 Digital Object Identifier 10.1109/29.1547.*

"Robust speech recognition training via duration and spectral-based stress token generation", Hansen, J.H.L.; Bou-Ghazale, S.E.; Speech and Audio Processing, IEEE Transactions on vol. 3, Issue 5, Sep. 1995 pp. 415-421.*

"Prosodic stress and topic detection in spoken sentences",Silipo, R.; Crestani, F.;String Processing and Information Retrieval, 2000. SPIRE 2000. Proceedings. Seventh International Symposium on Sept. 27-29, 2000 pp. 243-252.*

Samudravijaya K et al: "Pre-Recognition Measures of Speaking Rate" Speech Communication, Amsterdam, NL, vol. 24, No. 1, Apr. 1, 1998, pp. 73-84, XP004148061.

* cited by examiner

*Primary Examiner*—Michael N Opsasnick
(74) *Attorney, Agent, or Firm*—Oblon, Spivak, McClelland, Maier & Neustadt, L.L.P.

(57) ABSTRACT

To improve the performance and the recognition rate of a method for recognizing speech in a dialogue system, or the like, it is suggested to derive emotion information data (EID) from speech input (SI) being descriptive for an emotional state of a speaker or a change thereof based upon which a process of recognition is chosen and/or designed.

14 Claims, 1 Drawing Sheet

METHOD FOR RECOGNIZING SPEECH/SPEAKER USING EMOTIONAL CHANGE TO GOVERN UNSUPERVISED ADAPTATION

BACKGROUND OF THE INVENTION

1. Field of the Invention

The present invention relates to a method for recognizing speech/speaker and in particular to a method for recognizing speech/speaker which uses the emotional change to govern unsupervised adaptation of the involved recognizing process and in particular of the involved acoustic models. The present invention further relates to a method for operating a dialogue system and to a dialogue system.

2. Description of the Related Art

Nowadays, a large variety of equipment and appliances employ man-machine dialogue systems to ensure an easy and reliable use by human users. These man-machine dialogue systems are enabled to receive and consider users utterances, in particular orders and/or enquiries, and to react and respond in an appropriate way. To increase the recognition rate and therefore the rate of correct responses of the man-machine dialogue system or interface unit, speaker adaptation and in particular unsupervised speaker adaptation and techniques are often employed. The involved recognition processes therefore adapt their models or acoustic models to the current speaker to improve the performance. It is therefore necessary for the recognition process to adapt on utterances which are correctly recognized. However, sometimes these adaptation techniques lead to deteriorations in the recognition and therefore in a decreased rate of correct responses of the system because of misrecognitions.

SUMMARY OF THE INVENTION

It is an object of the present invention to provide a method for recognizing speech/speaker in a dialogue system which is particularly reliable with respect to the recognition and the responses of the system based upon these recognitions.

The object is achieved by a method for recognizing speech/speaker described herein. The object is also achieved by a method for operating a dialogue system described herein. Additionally, the object is achieved by a dialogue system and by a computer program product described herein.

According to the invention in the method for recognizing speech/speaker in a dialogue system or the like, speech input of at least one speaker is—in particular continuously and/or repeatedly—received. A process of recognition is performed based on said speech input. Emotion information data are derived from said speech input or from parts thereof, said emotion information data being descriptive for an emotional state of a speaker or a change thereof. The process of recognition is chosen and/or designed and/or modified based on said emotion information data.

It is a basic idea of the present invention to base the design and/or the structure of the process of recognition on the emotional situation with respect to the involved speaker or user of the system. This particular strategy is based on the fact that wrong recognition results realized or reflected by a speaker or user in general lead to a change of the emotional state of said speaker or user. And of course, the same holds for correct recognition results.

In the case of a wrong recognition result realized or reflected by the user, the user might get disappointed or angry. In contrast, in the case of correct recognition results a more or less critical emotional situation might be resolved. In any case the received speech input conveys emotional information which according to the invention is extracted into so-called emotion information data at least describing emotional states of the speaker or changes thereof. By evaluating the emotional states or the changes thereof the process of recognition is adapted, i. e. the strategy of recognizing the speech input is changed upon the emotional situation or development thereof with respect to the current or present speaker or user.

According to a preferred embodiment the inventive method for recognizing speech/speaker the step of choosing and/or designing the process of recognition is performed after given numbers of recognition results and in particular after each single recognition result. It is therefore possible to adapt the recognition strategy by choosing and/or designing the recognition process more or less continuously upon given numbers of obtained recognition results. Each recognition result may represent in the case of pure speech recognition a recognized word, a sequence of words, a phrase, a sentence, and/or the like. In the case of speaker or voice recognition said recognition result contains the speaker's identity.

According to a further embodiment of the invention the step of choosing and/or designing the process of recognition includes a step of selecting acoustic models or the like and/or sets thereof to be involved in the recognition process.

According to this particular measure the designing process for the recognition strategy therefore includes a selection process with respect to acoustic models or sets thereof on which the recognition process is based.

For the adaptation of the recognition process the emotion information data are generated so as to reflect emotional states of a given, i. e. a current or present speaker before and after a recognition result is presented.

That means that by receiving a speech input e. g. to be recognized, information of the current emotional state of the current speaker is conveyed and received. This particular emotional state at the time of the utterance of the received speech input may be referred to as a reference emotional state, i. e. an emotional state prior to recognition. After obtaining the recognition result with respect to the received speech input said recognition result is presented in some way to the speaker or user of the system. Upon realizing or reflection of the recognition result the emotional state of the speaker or user of the system may change. In any case, again the emotional state of the user after presenting the recognition result is analyzed and then compared with the reference emotional state prior to recognition.

This may be done by receiving a further speech input from the same speaker or user of the system and by again extracting emotion information data from this subsequent speech input. From the emotion information data and in particular from the emotional states prior and after recognition it may be evaluated on whether or not the expectations of the current speaker or user of the system are fulfilled.

The recognition result may be presented to the current speaker or user of the system directly, i. e. by displaying the recognized words or phrases or e. g. the speaker's identity. It is also possible to present the recognition result in an indirect way, for instance by reacting or responding to the speech input of the current speaker or user of the system in a correct or concludent way. This may be achieved by answering a question or serving a user enquiry or wish, i. e. in the case of an entertainment or service robot.

According to a further preferred embodiment of the invention a first set of acoustic models is selected for the process of recognition until said emotion information data shows or represents a predetermined emotional shift of a speaker. Upon said predetermined emotional shift a second set of acoustic models is selected.

According to this last mentioned measure two states of the current speaker or user of the system may be distinguished. But the inventive strategy is not restricted to the case of two distinct states of the current speaker or user of the system. A variety of different emotional states may be used for choosing and/or designing the strategy of the recognition process.

According to a particular embodiment of the present invention a negative shift is used as said predetermined emotional shift.

Additionally, shifts to anger, disappointment and/or the like are used as said emotional shifts. With respect to the two-state principle mentioned above, a first set of acoustic models is used in the recognition process for the case, that the speaker's or user's expectations can be fulfilled by the recognition process. If this is not the case, the emotional state of the present speaker or user of the system is negatively shifted and in particular shifted to a state of anger, disappointment, and/or the like. This negative shift is then represented by the extracted emotion information data. Upon this negative shift the recognition process is designed to use a second set of acoustic models which are different from the acoustic models of the first set.

In a particular embodiment the first set of acoustic models may contain speaker-adapted or speaker-adaptable acoustic models. On the other hand, said second set of acoustic models may contain speaker-independent acoustic models, which may then be involved for the case that the recognition process using adapted or adaptable acoustic models does not lead to a satisfying result.

The involved process of recognition may at least contain or include a sub-process of recognizing speech and/or a sub-process of recognizing a speaker.

According to a further aspect of the present invention a method for operating a dialogue system is suggested in which a method for recognizing speech/speaker according to the present invention is involved.

According to a further aspect of the present invention a system, an apparatus. a device, a dialogue system, and/or the like is provided which is in each case adapted to realize, to carry out and/or to perform a method for recognizing speech/speaker according to the invention and/or a method for operating the dialogue system according to the present invention.

It is a further aspect of the present invention to provide a computer product, comprising computer program means which is adapted to perform and/or to realize the inventive method for recognizing speech/speaker and/or the inventive method for operating a dialogue system and/or the steps thereof when it is executed on a computer, a digital signal processing means, and/or the like.

These and further aspects of the present invention will become more elucidated taking into account the following remarks:

In unsupervised speaker adaptation, the speech recognizer adapts its models to the current speaker to improve performance. For this to work, it is necessary that the recognizer adapts on utterances that are correctly recognized, as otherwise performance sometimes deteriorates to the point where the system is virtually unusable. However, such a deterioration is very likely to induce emotional shift towards anger, disappointment and rage in the user. A basic idea of the invention is to measure the shift of emotion during dialogue, and in case of a e. g. negative shift, revert back to the speaker-independent models: otherwise, use the speaker adapted models.

It has been proposed to govern speaker adaptation by some sort of confidence measure, where the confidence measure is based on acoustic features, language model features, and the like, and should give an indication about how reliable the recognition is, thereby avoiding the problem of misadaptation. However, it has never been suggested to run adaptation, or to revert adaptation already done, based on shift of emotional status during a dialogue.

The mentioned shift in the quality of the recognition rate is highly undesirable, and is one of the major obstacles in the use of unsupervised speaker adaptation techniques in real-life applications. Current techniques of confidence measurement are in general not very well suited to detect this type of shift, since they measure the distortion between the acoustic models and the input speech—however, this distortion is typically low in the case of mis-adapted models, so that current confidence measurement techniques tend to oversee this effect.

Suppose there is a dialogue between a user and a speech application, where the speech application uses unsupervised speaker adaptation to improve the recognition rate. This will, on average, produce lower speech recognition error rates as compared to the non-adaptation case.

In some situations however, adaptation will be carried out on misrecognized utterances, and then speaker adaptation will actually worsen the acoustic models instead of improving them. The speech recognition performance deteriorates. Since the next utterances from the user will probably be misrecognized again, and adaptation will again be carried out on misrecognized utterance data, the problem will worsen and the performance of the system will deteriorate significantly. The user will grow increasingly impatient and angry because the system performs worse and worse. In the end, the user will cease to use the speech operated device totally or will have to perform some manual reset operations on the device to enter the unadapted state again. However, the negative experience will shift the users attitude against the use of equipment from the manufacturer of this application which is from a commercial point of view very much unwanted.

It is a basic idea of the invention to measure the shift of emotion during dialogue, and make use of the detected impatience and anger in the mood of the user. More specifically, an emotion detector is run on the input, and the current emotional status of the user is monitored.

It is well-known that the accurate detection of emotional state is a very difficult problem, if tried in a speaker-independent way. However, for the invention described here, it is not necessary to measure the emotional status, but a change of emotional status is sufficient. Suppose the initial emotional status of the user, measured in the begin of the dialogue, is reflected by the coordinates (1.2, 2.7) on the 2-dimensional emotional plane that is spanned by the Activation and Pleasure axis. Then, this result might be shifted from the true emotional status of the user since the features of emotion exhibited by different speakers vary very much across speakers. But since the absolute values of the emotional status are not used, this is irrelevant for the invention.

Suppose that after unsupervised adaptation has been done, after some dialogue steps, the emotional state is shifted greatly towards negative—to, say, (0.0, 0.71). By taking the relative difference between the initial and the current emotional state, the speaker-dependency of the emotion detection is eliminated and the shift is detected properly. In this case, the system will then conclude that the adaptation is going wrong, and will revert the adapted speaker models to the speaker-independent ones, yielding much higher (the original, without adaptation) performance and thereby satisfying the user's needs.

If on the other hand the shift in emotional state is low, or positive, the system will continue to use the adapted models. Therefore, this invention combines the potentially beneficial effects of the speaker adaptation with the robustness of the speaker-independent models.

The shift of emotional state that is associated to a misadaptation can also be made dependent on the course of dialogue action. Suppose in a music selection scenario, the system does not have any music piece that satisfies the user's wishes at some point in the dialogue. This is also expected to shift user's emotion down. Consequently, a minor shift to negative is expected and should then not lead to reverting to speaker-independent mode. The same is true for events that are likely to shift the user's emotional status positively.

The average speech recognition performance of dialogue-based applications—applications, where the user issues multiple commands to the application, and not only one single command—is increased. User satisfaction is directly improved by measuring emotional shift and trying to remedy the cause of user dissatisfaction.

BRIEF DESCRIPTION OF THE DRAWING

In the following, further aspects and advantages of the present invention will be described taking reference to the accomanying FIGURE.

DETAILED DESCRIPTION OF THE INVENTION

Figure 1:
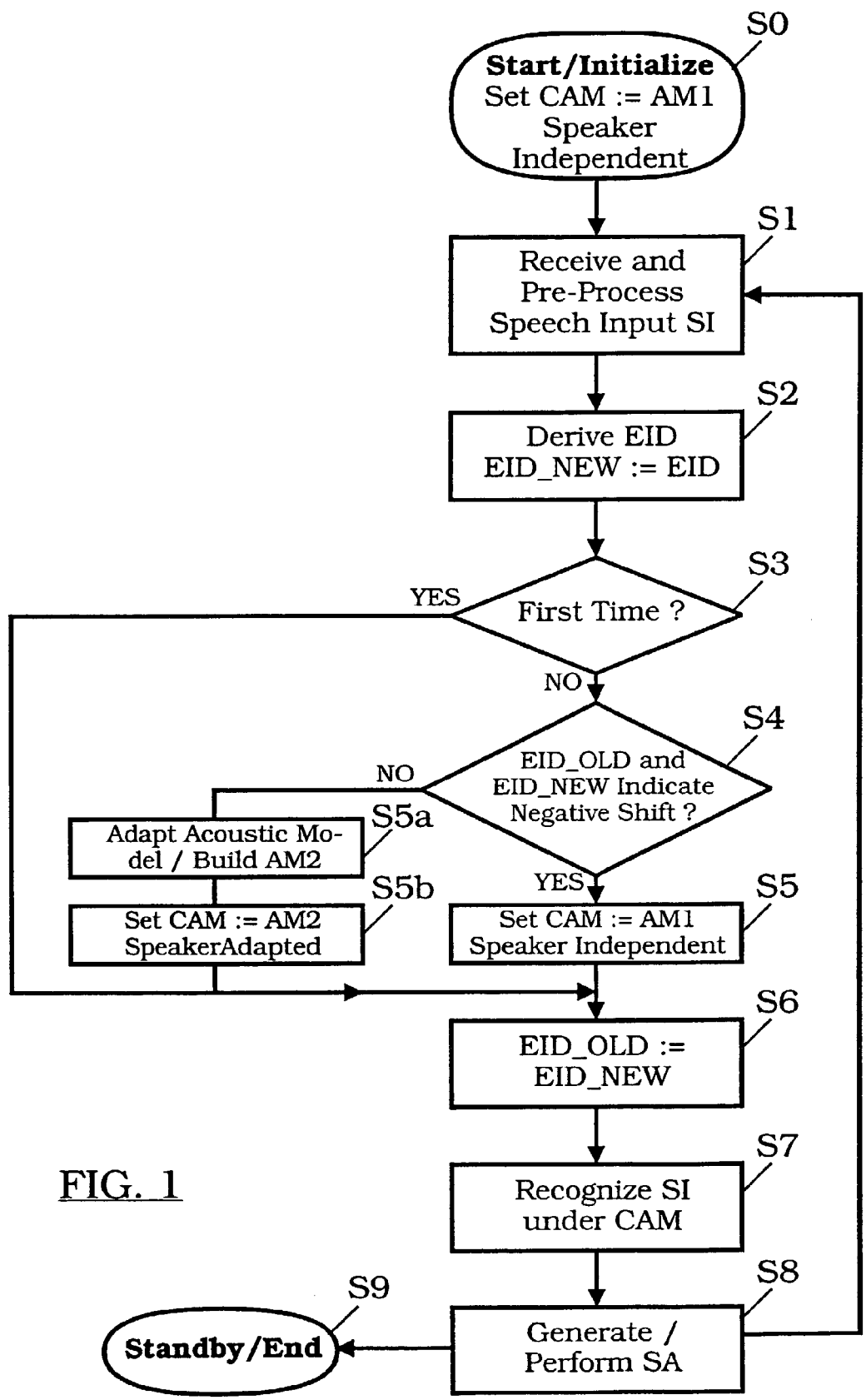
FIG. 1 is a schematical block diagram describing a preferred embodiment of a method for recognizing speech according to the present invention.

The schematical block diagram of FIG. 1 describes by means of a flow chart a preferred embodiment of the inventive method for recognizing speech/speaker in which emotional changes are used to govern unsupervised adaptation techniques, wherein for illustration a method for recognizing speech only is described.

In an initialization step S0 the method for recognizing speech according to the present invention is initialized, in particular by choosing a first acoustic model AM1 or a first set of acoustic models as a current acoustic model CAM or a current set of acoustic models, respectively. In the embodiment of FIG. 1 this initialization is performed to realize a speaker independent process, so that the underlying acoustic model AM1 is a speaker-independent acoustic model.

In the following step S1 a speech input SI of a current speaker or a user of the system is received and preprocessed.

In the next step S2 emotion information data EID are derived from the given speech input SI and used as new emotion information data EID_NEW.

In the next step S3 it is checked whether the method or the algorithm is carried out for the first time since the initialization step S0. If this is the case, the method branches to step S6, in which the new emotion information data EID_NEW is set as old emotion data EID_OLD.

Then in step S7 the recognition process with respect to the speech input SI is performed using the current acoustic model CAM, which is in the case of the first time of the performance of the algorithm the speaker-independent acoustic model AM1.

In the following step S8, based on the recognition result generated in step S7 a system action SA is generated and performed. This system action SA may be a process of displaying a recognition result to the speaker or user of the system or any other action which may in some sense represent the recognition result as mentioned above. Said system action SA may also be the process of switching to a step S9 of standby or ending the algorithm or method.

In general, however, the method directly branches back to step S1 to receive a further speech input SI and to step S2 to derive therefrom emotion information data EID as new emotion information data EID_NEW.

If the method is not performed for the first time after step S3 a step S4 follows in which it is checked whether or not the old emotion information data EID_OLD and the new emotion information data EID_NEW indicate a negative change or shift of the emotional state of the present speaker or user of the system. If this is not the case, the method branches to step S5a to perform a speaker adaptation on the current acoustic model CAM. This may also mean to involve a process of speaker recognition, where in the case of a known speaker an adapted acoustic model AM2 already available is uploaded. In step S5b said speaker adapted acoustic model AM2 is set as said current acoustic model: CAM:=AM2. In other embodiments speaker adaptation may also take place within the first run of the algorithm.

Then the method branches to step S6 to again update the old emotion information data EID_OLD: EID_OLD:=EID_NEW.

Then, step S7 is continued to perform the process of recognition based on the speaker-adapted or the speaker-adaptable acoustic model AM2 as said current language model CAM: CAM:=AM1.

If, however, a negative emotional change or shift is detected a speaker-independent acoustic model AMI or a set thereof is selected as said current acoustic model CAM or a current set thereof, respectively.

Afterwards, in step S7 the recognition process with respect to the speech input SI is performed on the basis of the speaker-independent acoustic model AM1 as said current acoustic model CAM.

The invention claimed is:

1. A method for recognizing speech/speaker in a speech recognition dialogue computer, comprising:
   receiving speech input (SI) of at least one speaker with the speech recognition dialogue computer;
   performing a process of recognition based on said speech input (SI) with the speech recognition dialogue computer;
   deriving emotion information data (EID) exclusively from said speech input (SI) or from parts thereof, said emotion information data (EID) being descriptive for a change in an emotional state of a speaker between before and after a recognition result is presented to the speaker or a system action realizable by the speaker is performed in response to the recognition result with the speech recognition dialogue computer; and
   selecting, depending on said emotion information data (EID), acoustic models or sets of acoustic models to be involved in the recognition process with the speech recognition dialogue computer.

2. The method according to claim 1, wherein said process of recognition at least includes a sub-process of recognizing speech.

3. The method according to claim 1, wherein said process of recognition at least includes a sub-process of recognizing a speaker.

4. The method according to claim 1, wherein the selecting acoustic models or sets of acoustic models is performed after each single recognition result.

5. The method according to claim 1, wherein the selecting acoustic models or sets of acoustic models is performed after a given number of recognition results.

6. The method according to claims 1 or 5, further comprising:

selecting a first set of acoustic models for the process of recognition until said emotion information data (EID) shows a predetermined emotional shift of a speaker, upon which a second set of acoustic models is selected.

7. The method according to claim 6, wherein a negative shift is used as said predetermined emotional shift.

8. The method according to claim 6, wherein shifts to anger or disappointment are used as said emotional shifts.

9. The method according claim 6 wherein speaker-adapted or speaker-adaptable acoustic models are involved in said first set of acoustic models.

10. The method according to claim 6, wherein speaker-independent acoustic models are involved in said second set of acoustic models.

11. A method of operating a dialogue system comprising:

receiving speech input (SI) of at least one speaker at a speech/speaker recognition unit;

performing a process of recognition based on said speech input (SI) with a recognition unit;

deriving emotion information data (EID) exclusively from said speech input (SI) or from parts thereof with an emotion information deriving unit, said emotion information data (EID) being descriptive for a change in an emotional state of a speaker between before and after a recognition result is presented to the speaker or a system action realizable by the speaker is performed in response to the recognition result; and selecting, depending on said emotion information data (EID), acoustic models or sets of acoustic models to be involved in the recognition process with the recognition unit.

12. A dialogue system comprising:

a speech/speaker recognition unit configured to receive speech input (SI) of at least one speaker;

a recognition unit configured to perform a process of recognition based on said speech input (SI);

an emotion information deriving unit configured to derive emotion information data (EID) exclusively from said speech input (SI) or from parts thereof, said emotion information data (EID) being descriptive for a change in an emotional state of a speaker between before and after a recognition result is presented to the speaker or a system action realizable by the speaker is performed in response to the recognition result; and said recognition unit further configured to select, dependent on said emotion information data (EID), acoustic models or sets of acoustic models to be involved in the recognition process.

13. A computer readable storage medium encoded with instructions, which when executed by a computer, causes the computer to perform a method comprising:

receiving speech input (SI) of at least one speaker with a speech recognition dialogue computer;

performing a process of recognition based on said speech input (SI) with the speech recognition dialogue computer;

deriving emotion information data (EID) exclusively from said speech input (SI) or from parts thereof, said emotion information data (EID) being descriptive for a change in an emotional state of a speaker between before and after a recognition result is presented to the speaker or a system action realizable by the speaker is performed in response to the recognition result with the speech recognition dialogue computer; and selecting, depending on said emotion information data (EID), acoustic models or sets of acoustic models to be involved in the recognition process with the speech recognition dialogue computer.

14. A method for recognizing speech/speaker in a speech recognition dialogue computer, comprising:

selecting speaker independent acoustic models for recognition of speech of a speaker with the speech recognition dialogue computer;

detecting an emotional shift of said speaker during a dialogue between said speaker and said dialogue computer, wherein the emotional shift is determined by analyzing a change in an emotional state of said speaker between before and after a recognition result is presented to the speaker or a system action realizable by the speaker is performed in response to the recognition result with the speech recognition dialogue computer;

selecting said speaker independent acoustic models for recognition if said emotional shift indicates a predetermined shift of emotion of said speaker towards impatience or anger with the speech recognition dialogue computer; and adapting said speaker independent acoustic models in an unsupervised manner to obtain speaker dependent acoustic models as long as said emotional shift does not indicate the predetermined shift with the speech recognition dialogue computer.

* * * * *